United States Patent [19]

Minaev et al.

[11] 4,047,360
[45] Sept. 13, 1977

[54] AUTOMATIC MACHINE FOR MAKING PACKAGES OF VISCOUS FOOD PRODUCTS BY ENCLOSING IN A CASING

[76] Inventors: Alexandr Ivanovich Minaev, Oktyabrskaya ulitsa, 89, kv. 50; Alexandr Valerievich Lebedev, Severny bulvar, 12-B, kv. 252, both of Moscow; Artur Viktorovich Mogilev, ulitsa Pervomaiskaya, 52-A, kv. 6, Dolgoprudny Moskovskoi oblasti, all of U.S.S.R.

[21] Appl. No.: 734,048

[22] Filed: Oct. 20, 1976

[51] Int. Cl.² .................. B65B 9/06; A22C 11/08
[52] U.S. Cl. ................................. 53/122; 17/40; 53/173
[58] Field of Search ............ 53/122, 170, 172, 173, 53/177; 17/35, 36, 37, 38, 39, 40, 41

[56] References Cited

U.S. PATENT DOCUMENTS

| | | | |
|---|---|---|---|
| 2,051,922 | 8/1936 | Vogt | 53/172 X |
| 2,575,467 | 11/1951 | Reichel et al. | 53/122 X |

*Primary Examiner*—Travis S. McGehee
*Attorney, Agent, or Firm*—Steinberg & Blake

[57] ABSTRACT

The invention relates to the food industry and can be utilized to utmost advantage in the production of sausage-like articles, sausage-shaped processed cheeses, packages of minced meat, flour, curd cream, cereals and like products.

The disclosed automatic machine includes a chargeable hopper for the product to be packaged, a positive displacement pump, a nozzle with a sleeve thereon, for feeding the product to be packaged into a casing, a mechanism for supplying a flat web of an elastic film onto the sleeve for forming the longitudinal layer of the casing on this sleeve and a device for pulling the casing stuffed with the product being packaged off the nozzle. In accordance with the invention, the automatic machine further including a mechanism for supplying a web of flat elastic film for forming a helically wound layer of the casing superimposed upon the longitudinal layer, the device for pulling the casing with the product being packaged off the nozzle being mounted directly on the latter.

The disclosed automatic machine enables to use a film of any kind for the packaging operation, without any additional welding or glueing up of the elements of the casing.

2 Claims, 1 Drawing Figure

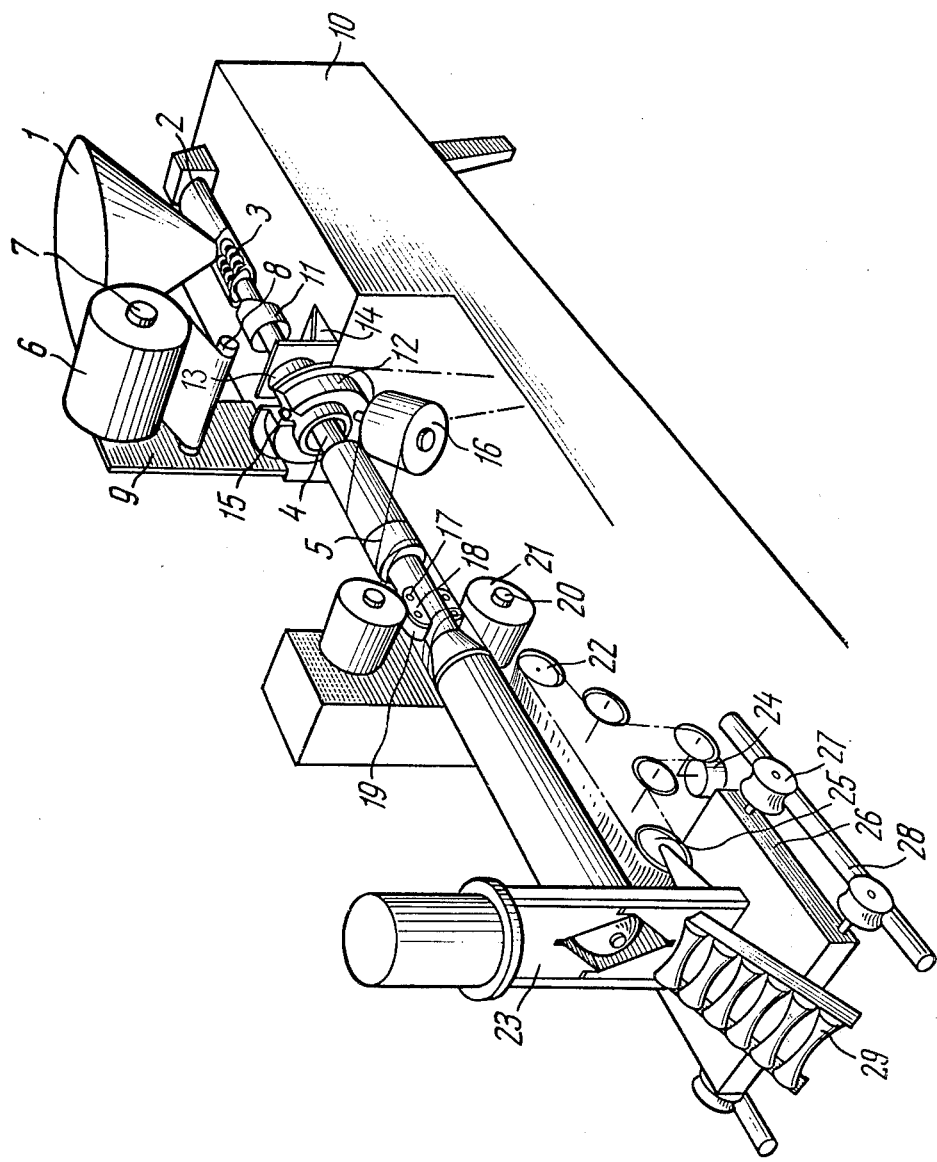

AUTOMATIC MACHINE FOR MAKING PACKAGES OF VISCOUS FOOD PRODUCTS BY ENCLOSING IN A CASING

The present invention relates to the food industry, and, more particularly, it relates to automatic machines for making packages of viscous food products by enclosing in a casing or a sheath.

The invention can be used to utmost effectiveness in the production of sausage-like articles, as well as in production of sausage-shaped processed cheeses.

Furthermore, the invention can be used for packaging minced meat, flour, curd cheese, cereals and other products exhibiting low fluidity, by enclosing in a casing or a sheath.

There is known an automatic machine for packaging food products by enclosing in a casing, comprising the following components arranged successively in a process-wise sequence: a hopper chargeable with a product to be packaged, a positive displacement pump, a nozzle with a sleeve for feeding the product to be packaged into a casing, a mechanism for forming on the sleeve the longitudinal layer of the casing from a flat elastic film web folded into a cylindrical tube, with the edges of the web overlapping, and a device for pulling the casing stuffed with the product being packaged off the nozzle.

The abovespecified known automatic machine is intended for packaging food products like curd cheese, minced liver for liver sausages and some kinds of minced meat. The automatic machine uses for the packaging material such films that can be welded by the action of elevated temperatures, high-frequency electric current or ultrasonic waves, i.e. films of the general saran or polyethylene type, which substantially limits down the field of applications of this machine. It is commonly known that in the food industry a host of production processes does not end with packaging. For example, boiled meat sausages and smoked processed brands of cheese after the packaging are subjected to a lengthy process of thermal treatment in the course of which there takes place diffusion of water and of smoking substance through the casing. Films of the general saran and polyethylene type are impermeable, whereby, when they are used as the casing material for boiled meat sausages, the water contained in the minced meat evaporates under the heating and ruptures the casing. On the other hand, when a casing of this type is used for products to be smoked, it would not let smoking substances find their way through the casing toward the product. The abovespecified automatic machine uses for packaging exclusively weldable film webs, the technique of securing together the two edges of the web forming the casing being welding performed by a specific apparatus mounted on the machine for the purpose.

Besides, the capacity of the abovespecified automatic machine is narrowed down by the design of the device for pulling the casing off the nozzle, because as the casing is being pulled off about the product being packaged, the casing displays a tendency to crease along the generatrix of the nozzle and to develop wrinkles, which eventually leads to ruptures if the casing is not strong enough.

It is the main object of the present invention to create an automatic machine for making packages of viscous food products by enclosing in a casing, which should be of an increased productivity in comparison with the hitherto known automatic machines of a similar kind.

It is another object of the present invention to create an automatic machine of the said kind, which should broaden the range of films usable for forming the casing, with neither welding nor glueing up performed.

These and other objects are attained in an automatic machine for making packages of viscous food products by enclosing in a casing, which should incorporate a mechanism providing for forming an adequately strong casing without any glueing-up or welding of the components of the casing.

This aim is attained in an automatic machine for making packages of viscous food products by enclosing in a casing, comprising a production process-wise sequence of successively arranged components including a hopper chargeable with a product to be packaged, a positive displacement pump, a nozzle with a sleeve thereon, for feeding the product to be packaged into the casing, a mechanism for supplying a flat web of an elastic film onto the sleeve for forming on the latter the longitudinally extending layer of the casing, and a device for pulling the casing stuffed with the product being packaged off the nozzle, which machine further comprises, in accordance with the invention arranged in the process-wise direction downstream of the mechanism for supplying the flat web of an elastic film onto the sleeve for forming on the latter the longitudinally extending layer of the casing, a mechanism for supplying another web of an elastic flat film for forming therefrom, above the longitudinally extending layer, a helically wound layer of the casing, the last-mentioned mechanism including a rotatable mandrel with a spool with a supply of the flat elastic film, mounted on this mandrel at an acute angle thereto, the last-mentioned film being intended for forming the helically wound layer of the casing, the device for pulling the casing with the product being packaged off the nozzle being mounted directly on the latter.

The incorporation of the mechanism for supplying the elastic flat film and forming therefrom the helically wound layer of the casing, superimposed upon the longitudinally extending one, enables to obtain from the film webs a double-layer casing of a high strength, which, in its turns, enables to do without either welding or glueing up of the components of the casing.

Furthermore, owing to the external layer of the casing, helically wound about the internal, longitudinally extending layer, securing the latter and yielding a strong double-layer casing, the disclosed automatic machine is capable of using a broad range of natural and man-made films for the packaging purposes, including the films which would not yield an adequately strong casing, if used as a single-layer casing.

It is most expedient that the device for pulling the casing stuffed with the product being packaged off the nozzle should include rollers mounted on the nozzle and arranged in pairs relative to the axis of the nozzle, and driving rolls arranged centrally of the rollers of each pair and adapted to be urged against the rollers, to bring the rolls into engagement with the casing, the geometric axes of the rollers and of the rolls being parallel, with one another.

The abovespecified structure of the device for pulling off the casing enables to move the casing along the nozzle in the most uniform fashion, the effort of urging the film by the rolls against the rollers being adjustable to provide for the quality of the film, its strength and the slip factor, which enables to preclude displacement of the external and internal layers of the casing with respect to each other and thus to obtain a casing of uniform strength in every direction.

The present invention will be further described in connection with an embodiment thereof, with reference being had to the accompanying drawing schematically illustrating an automatic machine for making packages of viscous food product by enclosing in a sheath, according to the invention.

The invention will be described in connection with its embodiment in an automatic machine for making packages of viscous food products by enclosing in a casing or a sheath, particularly, of boiled sausages enclosed in a casing.

Referring now to the appended drawings, the automatic machine includes the following components arranged in succession in a process-wise sequence: a chargeable hopper 1 adapted to receive the product to be packaged, e.g. minced meat for sausages, a positive displacement pump 2 with screws 3, a nozzle 4 with a sleeve 5 for feeding the minced meat into a casing, a mechanism for supplying a web of an elastic flat film onto the sleeve 5, to form thereon a tubular longitudinal layer of the casing. The said mechanism includes a spool 6 with a supply of the film, mounted on an arbor 7 and an intermediate roller 8 for levelling out the film. The arbor 7 and the roller 8 are supported by a bracket 9 mounted on the framework 10 of the automatic machine. The nozzle 4 receives thereabout a folder device 11 for folding the flat film into a tubular cylinder about the sleeve 6, the tubular cylinder being the internal layer of the casing, extending longitudinally of the sleeve 5. The diameter of the sleeve 5 is selected to equal the diameter of the package to be turned out by the machine.

In accordance with the invention, the automatic machine additionally has, arranged downstream in the process-wise sense of the aforesaid mechanism for supplying the flat elastic film onto the sleeve 5, another mechanism for supplying another flat elastic film to be formed into a helically wound layer of the casing, superimposed onto the longitudinally extending layer of the casing, i.e. into the external layer of the sheath.

In accordance with the invention, this last-mentioned mechanism includes a rotatable mandrel 12 supported about a tube 13 mounted on a bracket 14 secured to the framework 10 of the automatic machine.

The mandrel 12 is rotatable about the tube 13, on a bearing 15. Mounted on the mandrel 12, at an acute angle thereto is a spool 16 with another supply of an elastic flat film to be formed into a helically wound external layer of the casing.

The outlet end portion of the nozzle 4 has mounted thereon a device for pulling the double-layer casing stuffed with the sausage meat off the nozzle. The device includes arbors 17 mounted on supports 18 and carrying thereon rollers 19 arranged in pairs with respect to the axis of the nozzle 4, the latter supporting the entire device. Shafts 20 support thereon driven rubber rolls 21, arranged centrally of the pairs of the rollers 19, one roll 21 per each pair of the rollers 19, the rolls 21 being adapted to be urged against the rollers 19, to bring the rolls 21 into engagement with the casing. The geometric axis of the rolls 21 and of the rollers 19 are parallel. Mounted on the framework 10 downstream of the nozzle 4 in the process-wise direction is a chain conveyor 22 for advancing the stuffed casing into a clip-applying and sausage-severing mechanism 23. The chain conveyor 22 is provided with a tensioning weight device 24, its driving sprocket 25 being mounted on the clip-applying mechanism 23.

The clip-applying and sausage-severing mechanism 23 is mounted on a movable carriage 26 supported by caster wheels 27 for reciprocation along guideways 28. The carriage 26 supports thereon a delivery rollerway 29 directing ready and severed sausages to subsequent treatment.

The disclosed automatic machine operates, as follows.

Under the action of a drive (not shown), the feed screws 3 of the positive displacement pump 2 rotate and feed the sausage meat from the hopper 1 into the feed nozzle 4. At the same time, the rubber rolls 21 mounted on the shafts 21 are rotated by another drive (not shown, either) to pull the casing made up by two layers of the film along the sleeve 5. The double-layer casing is prepared, as follows: the operator puts the spool 6 with a supply of the film to be formed into the internal layer onto the arbor 7 and threads the film over the levelling-out roller 8 supported by the bracket 9 secured to the housing 10. Then the operator threads the film web through the folder device 11 which folds the flat film web into a tubular cylinder, through the tube 13 and about the sleeve 5. The film web to be formed into the internal and external layers of the casing from the spool 16 on the mandrel 12 is threaded under the rolls 21. The mandrel 12 journalled about the tube 13 by means of the bearing 15 is associated with a drive (not shown) which also actuates the rolls 21; therefore, with the last-mentioned drive energized, there takes place simultaneously the formation of the two layers of the casing and pulling of the casing off the nozzle 4. Having passed through the folder device 11, the film forms the tubular layer of the casing with some overlap of the edges, and the internal layer is held together by the rotating mandrel 12 applying the second, external layer along a helix, with every successive round or coil partially overlapping the preceding one. It can be seen that the herein disclosed technique of forming a casing is particularly advantageous when film webs having different mechanical strength along and across the web are used, because the herein disclosed machine applies the internal and external layers in a somewhat criss-cross fashion. The practically ready casing is threaded by the rolls 21, being urged against the rollers 19. The latter freely rotate on their arbors 17 mounted in the bracket plates 18 supported by the nozzle 4. The rubber rolls 21 rotated with their respective shafts 20 by the aforementioned drive (not shown) pull the casing off the nozzle 4.

The incorporation in the herein disclosed structure of the rollers 19 mounted on the nozzle 4 under the casing enables to roll the casing off the nozzle 4, thus precluding creasing of the casing, which is of paramount importance when films of low strength are used, as well as when the internal and external layers are not mechanically secured together, i.e. are neither glued up nor welded.

The product fed by the pump 2 is forced from the nozzle 4 into the ready casing and stuffs it, thus supplying the effort retaining the cylindrical shape of the package.

The continuous cylindrical package is further advanced by the chain conveyor 22 tensioned by the tensioning weight arrangement 24 into the metal clip-applying and package-severing mechanism 23. Since the cylindrical package advances continuously at a permanent speed, the application of metal clips is effected without interrupting the motion of the package, with the clip-applying and package-severing mechanism 23 being mounted on the reciprocable carriage 26 with caster wheels 27 engaging the guideways 28. The respective drive (not shown) effects reciprocation of the carriage 26 along the axis of the advance of the package. The application of two clips and the severing of the neck between these clips is effected by the mechanism 23 while the carriage 26 is moving in the same direction with the package. The driving sprocket 25 of the chain conveyor 22 being supported by the clip-applying mechanism 23, the chain conveyor 22 is cyclically extended and contracted by the reciprocation of the carriage 26, while all the time affording a continuous supporting surface between the clip-applying mechanism 23 and the nozzle 4. A ready and severed package rolls down by gravity along the delivery rollerway 29 directing it to further processing.

The present invention offers the formation of a casing which enables to do without any connecting members and either welding or glueing up of the edges of the layer or layers of the casing, since in the casing formed in accordance with the invention the internal layer withstands or detains the expansion effort of the stuffing, directed along the package, while the external layer withstands or detains the expansion effort directed transversely of the package.

We claim:

1. An automatic machine for making packages of viscous food products by enclosing in a casing, comprising: a hopper adapted to be charged with a product to be packaged; a positive displacement pump communicating with said hopper; a nozzle communicating with said pump, adapted to feed the product being packaged into a casing; a sleeve mounted about said nozzle and adapted to have formed thereon the longitudinally extending layer of the casing; a mechanism for supplying a flat elastic film web onto said sleeve; a mechanism for supplying another flat elastic film web to be formed into a helically wound layer of the casing, superimposed upon the longitudinally extending layer thereof, said last-mentioned mechanism including a mandrel mounted for rotation, a drive adapted to impart rotation to said mandrel, operatively connected therewith; a spool with a supply of the elastic flat film web to be formed into the helically wound layer of the casing, rigidly secured on said mandrel at an acute angle thereto; a device for pulling the casing stuffed with the product being packaged off said nozzle, mounted directly on said nozzle.

2. An automatic machine as set forth in claim 1, wherein said device for pulling the casing stuffed with the product being packed off said nozzle includes rollers mounted on said nozzle in pairs with respect to the axis of said nozzle and driven rolls arranged centrally of the rollers of each pair, these driven rolls being adapted to be urged toward the respective rollers, to provide for engagement between the rolls and the casing, the respective geometric axes of the rollers and of the rolls being parallel with one another.

* * * * *